(12) United States Patent
Blair

(10) Patent No.: US 8,186,919 B2
(45) Date of Patent: May 29, 2012

(54) LOCK WASHER

(75) Inventor: James F. L. Blair, Lanark, IL (US)

(73) Assignee: Saint Technologies, Inc., Shannon, IL (US)

( * ) Notice: Subject to any disclaimer, the term of this patent is extended or adjusted under 35 U.S.C. 154(b) by 321 days.

(21) Appl. No.: 12/510,919

(22) Filed: Jul. 28, 2009

(65) Prior Publication Data
US 2011/0027039 A1 Feb. 3, 2011

(51) Int. Cl.
*F16B 39/32* (2006.01)
(52) U.S. Cl. .......................... 411/125; 411/127; 411/128
(58) Field of Classification Search .................. 411/116, 411/125, 128, 129, 127, 131
See application file for complete search history.

(56) References Cited

U.S. PATENT DOCUMENTS

| | | | | |
|---|---|---|---|---|
| 391,410 A | * | 10/1888 | Gamble | 411/126 |
| 723,882 A | * | 3/1903 | Krohn | 411/126 |
| 809,044 A | * | 1/1906 | Clark | 411/126 |
| 974,073 A | * | 10/1910 | Kesberger | 411/126 |
| 986,110 A | * | 3/1911 | Whiteman | 411/125 |
| 1,349,404 A | | 8/1920 | Blake | |
| 1,386,092 A | * | 8/1921 | Cole | 411/126 |
| 1,891,563 A | * | 12/1932 | Lillig | 411/126 |
| 5,562,378 A | | 10/1996 | Blechschmidt et al. | |
| 5,681,136 A | | 10/1997 | Blair | |
| 5,755,824 A | | 5/1998 | Blechschmidt et al. | |
| 6,976,817 B1 | | 12/2005 | Grainger | |

FOREIGN PATENT DOCUMENTS

FR 1.394.517 2/1995

OTHER PUBLICATIONS

"Positive Locking Fastener", Web page, yet2.com (2 pages), printed Jul. 28, 2010.

* cited by examiner

*Primary Examiner* — Victor Batson
*Assistant Examiner* — James Cline, Jr.
(74) *Attorney, Agent, or Firm* — Wood, Phillips, Katz, Clark & Mortimer

(57) ABSTRACT

A lock washer includes a planar washer body formed of a sheet of resilient metal having a selected thickness no less than the pitch thread of the bolt with which it is to be used. First and second lock tabs integral with the body extend radially outward of the central aperture, wherein each of the tabs has a radially inward facing, straight, free edge transverse to a radius of the body, and each of the tabs is displaced by a spring bend to one side of the plane of the body. The washer body is etched to a selected lesser thickness in the area of the spring bend to provide a selected spring force when the tab is pushed down to the plane of the body.

7 Claims, 1 Drawing Sheet

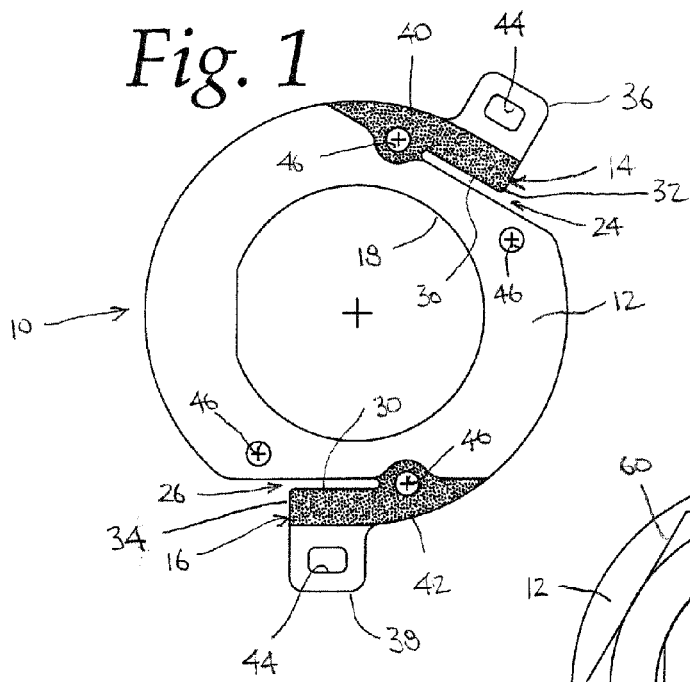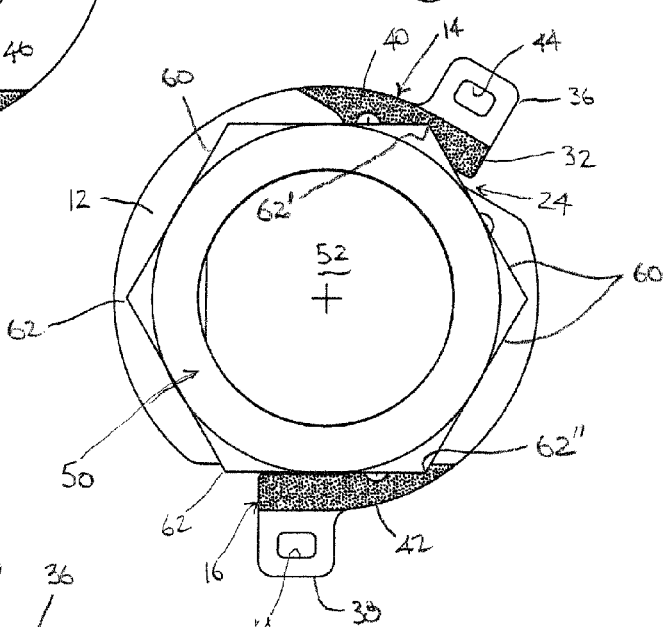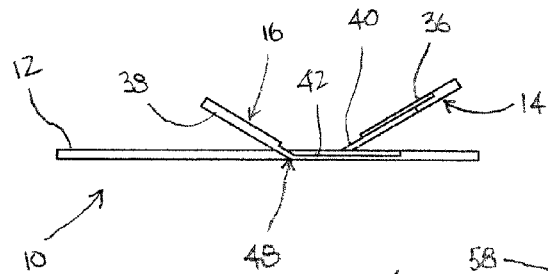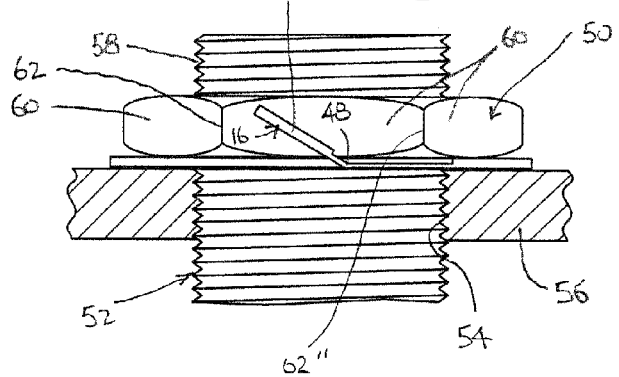

LOCK WASHER

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to a lock washer, and more particularly, to a lock washer that will positively retain a nut while being readily releasable as well as reusable.

BACKGROUND OF THE INVENTION AND TECHNICAL PROBLEMS POSED BY THE PRIOR ART

Lock washers are commonly used in many different fields. As a consequence, there are large varieties of lock washer configurations that have evolved over the years for use in specific environments. Many have detriments of one sort or another associated with their use.

For example, it is not unusual to provide lock washers that include a sharp edge or point displaced from the body of the washer so as to dig in or gouge one or both of the nut that is being locked and the surface to which the nut is applied. While these types of lock washers work well for their intended purpose in many environments, they are not satisfactory where corrosion presents a problem. More particularly, where such lock washers are used after a protective coating has been applied to one or the other of the components to be joined, the gouging action provided by the sharp edge will always penetrate the coating if a good locked joint is to be obtained. As a result, the protective coating is no longer continuous and moisture or other corrosive substances may penetrate the joint with corrosion resulting.

Other lock washers include lock tabs which are displaced in the plane of the body of the washer and which have flat free edges which are adapted to abut a flat of the nut to be locked. See, for example, U.S. Pat. No. 1,349,404 issued Aug. 10, 1920 to Blake. In this construction, a plurality of lock tabs greater in number than the number of flats on the nut to be locked is provided and all project away from the plane of the washer to be located about the periphery of the nut. While these types of lock washers work well in terms of providing the desired locking function, it is difficult to loosen the nut, and reuse of the lock washer may be a problem.

Typically, lock washers are made of a resilient metal and each of the lock tabs requires a force of 8-10 lbs. to depress the same back into the plane of the base of the washer. It is necessary to displace each tab back into the plane of the base of the washer to move it out of interfering relation with the flats of the nut if the nut is to be loosened.

When a number of the tabs are present as in Blake and other constructions, the total force involved may be 65-80 lbs. While such a force may be applied axially through the use of a socket wrench, where it is necessary to loosen the nut with a box end or open end wrench, the average user of such a tool is incapable of applying such a force over the lever arm represented by the length of the wrench, making removal difficult, if not impossible.

Furthermore, such constructions are extremely difficult to loosen with an open end wrench even if the force of the locked tabs can be overcome. Specifically, an open end wrench, by reason of its open ended geometry, will typically be incapable of depressing all of the lock tabs which in turn means that one or more lock tabs will spring into locking position in abutment with the flat of the nut, preventing its rotation.

If, in such a situation, rotation of the nut is forced, then the lock washer will be permanently distorted and cannot be reused.

French patent document 1,394,517 issued Feb. 22, 1965 to Bruhwiler, et al., provides a means of at least overcoming potential corrosion problems through the use of a locating tab on the body of the lock washer which may be received in a notch or recess in the surface to which the lock washer is applied to prevent the lock washer from rotating. However, Bruhwiler continues to employ a large number of lock tabs that require substantial force to displace into the plane of the washer body and which prevent ready loosening of the nut with a tool such as an open end wrench. Furthermore, the pointed lock tabs of Bruhwiler may hinder loosening of the nut in that they may have a tendency to dig into the sides of the loosening tool and hinder its rotation. When such occurs, to the extent the rotation is forced, then the lock tabs are permanently deformed and the Bruhwiler lock washer cannot be reused.

U.S. Pat. No. 5,562,378, which issued Oct. 8, 1996 to Blechschmidt, discloses a lock washer having lock tabs which may be bent up, out of plane, to a position adjacent a flat of the nut. While this structure has been found to be advantageous in a number of ways, there is a trade off required in the strength (i.e., thickness) of the washer body relative to the lock tabs. Specifically, when the washer is relatively thick, the bending of the lock tabs may require an unacceptably large force. By contrast, when the washer is relatively thin, while the lock tabs may bend more easily, engagement of the lock tabs by a socket may be more difficult. Moreover, a thin washer will not only be weaker but the washer body may also be so thin around its center opening as to undesirably fall into the pitch of the bolt thread.

An improvement upon U.S. Pat. No. 5,562,378 has been to provide a thin washer and to weld a ring-like portion onto the top of the washer body. While this has assisted in preventing the center of the washer body from falling into the pitch of the bolt thread while leaving more easily bent lock tabs, engagement of the lock tabs can still be difficult, and the handling of pieces, and related cost and time required for production of such lock washers, can be significantly higher than that associated with the lock washer of U.S. Pat. No. 5,562,378.

The present invention is directed to overcoming one or more of the above problems.

SUMMARY OF THE INVENTION

In one aspect of the present invention, a lock washer is provided for use with a nut and bolt, wherein the bolt has a threaded shank with a pitch thread. The lock washer includes a planar washer body formed of a sheet of resilient metal having a selected thickness no less than the bolt pitch thread, with the body having a central aperture and adapted to receive the shank of the bolt to which the nut is to be attached and locked. First and second lock tabs integral with the body extend radially outward of the central aperture, wherein each of the tabs has a radially inward facing, straight, free edge transverse to a radius of the body, and each of the tabs is displaced by a spring bend to one side of the plane of the body. The washer body is etched to a selected lesser thickness in the area of the spring bend to provide a selected spring force when the tab is pushed down to the plane of the body.

In one form of this aspect of the present invention, the nut has N flats where N is an integer equal to one of 4, 5 and 6, and the lock tabs are angularly spaced by more than 90° and less 180° whereby when the free edge of one lock tab is engaging the flat of the nut, the free edge of the other lock tab underlies a point of the nut between two adjacent flats.

In another form of this aspect of the present invention, the lock tabs and free edge are defined by notches.

In still another form of this aspect of the present invention, the nut has N flats, and the number of the lock tabs is in an integer of two or greater and less than N.

In yet another form of this aspect of the present invention, a wing is on the end of each lock tab, with each wing projecting generally radially outwardly from the end of the lock tab. In a further form, the etching does not extend to the wings whereby the wings have the selected thickness and, in a still further form, the etched area is on the one side of the plane of the body.

In another form of this aspect of the present invention, the etched area is on the one side of the plane of the body.

In another aspect of the present invention, a method of forming a lock washer for use with a nut and bolt is provided, including the steps of (a) forming a planar washer body from a sheet of resilient metal having a selected thickness no less than the bolt pitch thread, the body having a central aperture adapted to receive the shank of the bolt to which the nut is to be attached and locked, (b) cutting notches in the body radially outward of the central aperture to define first and second lock tabs, each of the notches extending substantially transverse to a radius of the body to define a radially inward facing, straight, free edge also transverse to a radius of the body, (c) etching the washer body outward of the central aperture to a selected lesser thickness in an area wherein the lock tabs are integral with the washer body, and (d) forming a spring bend in the lesser thickness area of each lock tab to displace the associated tabs to one side of the plane of the body whereby the spring bend provides a selected spring force when the tab is pushed down from its displaced position to the plane of the body.

In one form of this aspect of the present invention, the lock tabs each include a wing extending in a generally radial direction from their end, wherein the etching is not performed on the wings whereby the wings have the selected thickness. In a further form, the etching is performed on the one side of the plane of the washer body.

In another form of this aspect of the present invention, the etching is performed on the one side of the plane of the washer body.

BRIEF DESCRIPTION OF THE DRAWINGS

FIG. 1 is a plan view of one embodiment of a lock washer made according to the invention;

FIG. 2 is a side elevation of the lock washer;

FIG. 3 is a plan view of the lock washer of FIGS. 1 and 2 as it would appear if installed; and FIG. 4 is a side elevation of the installed lock washer with parts shown in section.

DETAILED DESCRIPTION OF THE INVENTION

Referring to the Figures, the lock washer 10 includes a ring like body, generally designated 12, formed from a thin sheet of resilient, metallic material having a selected thickness. For example, tempered stainless steel sheet having a thickness of 0.030" may be employed. As best seen in FIG. 2, the body 12 is planar except for two integral lock tabs 14, 16. Though not shown, a locating tab such as shown in U.S. Pat. No. 5,562,372 may also be included (the full disclosure of U.S. Pat. No. 5,562,372 is hereby incorporated by reference).

The body 12 includes a central aperture 18 which is generally circular with a diameter which is just slightly greater than the diameter of the shank of the bolt whose nut is to be locked. The lock tabs 14, 16 are radially outward from the central aperture 18.

First and second notches 24, 26 are formed in the body 12 to define the tabs 14, 16. Notches may advantageously be employed for the purpose of relieving stresses where the tabs 14, 16 join the remainder of the body 12, though cuts separating the tabs 14, 16 from the radially inward portion of the lock washer could also be used.

The notches 24 and 26 are arranged so that each tab 14, 16 includes a straight free edge 30. Each of the free edges 30 is located to be transverse, that is, at 90 degrees, to a radius of the body 12, which radius may be considered as extending from the center of the central aperture 18.

The tabs 14, 16 have non-pointed, flat ends 32, 34 respectively. As a result, the ends 32, 34 will not tend to gouge or penetrate the surface of a wrench or socket being rotated counter clockwise relative to the body 12.

Additionally, wings 36, 38 extend generally radially outwardly from the ends of the tabs 14, 16. The wings 36, 38 are easy to engage by a socket to facilitate removal of the washer 10 when desired.

Moreover, in accordance with the present invention, the lock washer 10 is further formed by etching the tabs 14, 16 so that the tabs 14, 16 have a reduced thickness to facilitate bending of the tabs as desired, both for use and during removal of the nut. For example, in a sheet having a thickness of 0.030" as previously indicated, the areas indicated at 40 and 42 may advantageously be etched down to a thickness of 0.015" with suitable tolerances (e.g., within 0.002"). This allows a desired lower spring force to be maintained in the tabs 14, 16 while also maintaining a thicker base material to prevent the washer 10 from falling into the pitch of the bolt thread.

It should also be appreciated that the wings 36, 38 are not etched, and therefore the wings 36, 38 have the same thickness as the base material such as remains in the center portion of the washer body 12. As a result, engagement of the wings 36, 38 with a socket will leave little possibility of negative deflection when a socket is pushed down when removal of the nut is desired. Openings or holes 44 may also be provided in the wings 36, 38 to reduce mass.

Holes 46 may be advantageously provided in the lock washer 10 to facilitate mounting washer blanks for suitable machining and etching during manufacture, as shown in U.S. Pat. No. 5,755,824, the full disclosure of which is hereby fully incorporated by reference. Universal spacing of the holes 46 may be used to allow universal tooling for manufacturing different size/diameter lock washers 10.

As best seen in FIG. 2, the lock tabs 14, 16 are bent to form spring bends 48 in the etched areas 40, 42 which orient the tabs 14, 16 toward one side of the plane of the body 12.

As few as two tabs 14, 16 may be employed as lock tabs. The free edges 30 are radially spaced from the center of the opening 18 a distance approximately equal to or just slightly greater than the distance from the center of the nut with which the washer is to be used to the nearest point on a flat of the nut.

It should be appreciated from FIG. 1 that the tabs 14, 16 are not diametrically opposite one another. Rather, depending particularly upon the flats of the nut, they may advantageously be angularly spaced by more than 90 degrees, but less than 180 degrees (135 degrees being a particularly desired spacing if the nut with which the washer is to be used is a six sided nut). This same spacing can be advantageously used with a four sided nut, but if an extremely rare, five sided nut is used, a spacing other than 135 degrees might be desirable. Nonetheless, spacing would remain at greater than 90 degrees and less than 180 degrees.

It should thus be appreciated that lock washers 10 according to the present invention may be advantageously manufactured by:

(a) forming a planar washer body from a sheet of resilient metal having a selected thickness, the body having a central aperture,
(b) cutting notches in the body radially outward of the central aperture to define first and second lock tabs, each of the notches extending substantially transverse to a radius of the body to define a radially inward facing, straight, free edge also transverse to a radius of the body,
(c) etching the washer body outward of the central aperture to a selected lesser thickness in an area wherein the lock tabs are integral with the washer body, and
(d) forming a spring bend in the lesser thickness area of each lock tab to displace the associated tabs to one side of the plane of the body whereby the spring bend provides a selected spring force when the tab is pushed down from its displaced position to the plane of the body.

Advantageously, the etching may be performed on the side of washer body plane to which the tabs 14, 16 are displaced.

Turning to FIGS. 3 and 4 specifically, a nut, generally designated 50, has been applied to the shank, generally designated 52, of a bolt, which extends through an aperture 54 in a panel 56 or the like. The bolt shank 52 has a thread 58 with a known or determinable pitch, which is to be used with a lock washer 10 having a body 12 having a selected thickness which is sufficiently large to prevent the body 12 from falling into the thread pitch.

As illustrated, the nut 50 is a hex nut, which is to say it has six, equally angularly spaced flats 60 as is well known, though it should be appreciated that lock washers according to the present invention could also be used with different nuts. For example, the nut could have N flats where N is an integer equal to one of 4, 5 and 6, and the lock tabs be angularly spaced by more than 90° and less 180°. Further, where the nut has N flats, and the number of the lock tabs could be an integer of two or greater and less than N.

Adjacent flats 60 of the nut 50 are separated by points 62. As can be appreciated from FIGS. 3 and 4, the lock tab 16, due to its inherent resilience and its being displaced to one side of the plane of the body 12 has moved upwardly such that its free edge 30 is in substantial abutment with one of the flats 60 along a substantial portion of the length thereof. As a consequence, counterclockwise rotation of the nut 50 (assuming that the shank 52 has a right handed thread) is blocked by the lock tab 16 to prevent the same from loosening. At the same time, one of the points 62' overlies the tab 14 and in effect has deflected the same back into the plane of the body 12.

If the nut 50 is to be further tightened on the shank 52, the point 62" shown in FIG. 3 will cam the lock tab 16 back down into the plane of the body 12 to allow such tightening. At the same time, when the point 62' depressing the tab 14 passes past the end 32 thereof, the latter will spring up to abut one of the flats 60 and prevent reverse rotation unless, of course, held down by a tool or the like.

When it is desired to loosen the nut 50, a tool such as a socket wrench, an open end wrench or a box end wrench is applied to the nut and a small force applied to the same along the axis of the shank 42. With a lock washer according to the present invention, only the tab 16 or the tab 14, but not both, will be blocking one of the nut flats 60, it is only necessary to depress a single tab 16 or 14. Moreover, due to the selected reduced thickness of the etched areas 40, 42 of the tab(s) 14, 16, it should be appreciated that only a selected reasonable amount of downward (in FIG. 4) force can be required to push down the tab 16 or 14, even if the washer body 12 is particularly thick. Thus, lock washers 10 made according to the present invention may be substantially easier to use in terms of loosening the nut while also being thick enough to prevent the washer body 12 from falling into the pitch of the thread of the bolt 52.

Further, because so little axial force is required to depress one or the other of the tabs 14 or 16, it should be appreciated that there is no need to force the rotation of the nut 50 against either of the tabs to permanently deform the same. Consequently, a lock washer made according to the invention is readily reusable.

It should also be appreciated that the illustrated embodiment, through the use of a planar body 12, does not gouge or penetrate either the nut 50 or the panel 56. As a consequence, corrosion producing sites are avoided. Furthermore, sharp points are avoided throughout.

From the foregoing, it will be readily appreciated that lock washers made according to this invention may provide numerous advantages. For one, they may be readily and easily loosened when desired through the use of standard tools such as open end wrenches. The washer may be thick enough so that it will not fall into the pitch of the thread of the bolt, and at the same time desired loosening may be accomplished without requiring a large force in the axial direction of the bolt. Moreover, manufacture of such advantageous lock washers may be easily and inexpensively accomplished. The wing of the lock tabs additionally facilitate engagement of the washer with a removal tool while providing little possibility of negative deflection when a socket is pushed down during nut removal. Further, when in place, lock washers according to the present invention eliminate the generation of corrosion sites, and eliminate vibratory motion of the nut when clamp load is lost. Still further, such lock washers are not destroyed as a result of use and/or removal, and thus may be readily reused.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A lock washer for use with a nut and bolt, wherein the bolt has a threaded shank with a pitch thread, said lock washer comprising:
  a planar washer body formed of a sheet of resilient metal having a selected thickness between top and bottom surfaces, said body having a central aperture and adapted to receive the shank of the bolt to which the nut is to be attached and locked;
  first and second lock tabs integral with said body radially outward of said central aperture, wherein each of said tabs have
    a radially inward facing, straight, free edge transverse to a radius of said body, a spring bend biasing said tab to a displaced position in which the tab is bent to one side of the plane of said body, said washer body having a thickness in the area of the spring bend less than said selected thickness to provide a selected spring force adapted to allow the tab to be pushed down to a coplanar position, and a wing on an end of the tab spaced from the spring bend, said wing projecting radially outwardly away from the washer body central aperture and having said selected thickness whereby when in the coplanar position said wing has top and bottom surfaces substantially coplanar with the top and bottom surfaces of the washer body.

2. The lock washer of claim 1 in combination with a nut having N flats where N is an integer equal to one of 4, 5 and 6, wherein said lock tabs are angularly spaced by more than 90° and less 180° whereby when the free edge of one lock tab is engaging the flat of the nut, and the free edge of the other lock tab underlies a point of the nut between two adjacent flats.

3. The lock washer of claim 1, wherein said lock tabs and free edge are defined by notches.

4. The lock washer and nut combination of claim 2, wherein the number of said lock tabs is in an integer of two or greater and less than N.

5. The lock washer of claim 1, wherein said lesser thickness area includes one surface which is substantially coplanar with one of the top and bottom surfaces of the washer body.

6. A method of forming a lock washer for use with a nut and bolt, wherein the bolt has a threaded shank with a pitch thread, comprising the steps of:

forming a planar washer body from a sheet of resilient metal having a selected thickness, said body having a central aperture adapted to receive the shank of the bolt to which the nut is to be attached and locked;

cutting notches in said body radially outward of said central aperture to define first and second lock tabs, each of said notches extending substantially transverse to a radius of said body to define a radially inward facing, straight, free edge also transverse to a radius of said body;

etching one side of said washer body outward of said central aperture to a thickness less than said selected thickness in an area wherein the lock tabs are integral with the washer body, wherein said etching is not performed at wings at ends of the first and second lock tabs and extending in a generally radial direction from the washer body central aperture whereby said wings have said selected thickness;

forming a spring bend in the lesser thickness area of each lock tab to displace the associated tabs to one side of the plane of said body whereby the spring bend provides a selected spring force when the tab is pushed down from its displaced position to the plane of said body.

7. The method of claim 6, wherein said etching is performed on said one side of said plane of said washer body.

* * * * *